June 13, 1961 A. BRUEDER 2,988,397
MOTOR VEHICLE BODIES
Filed Sept. 19, 1956 4 Sheets-Sheet 2

Inventor
Antoine Brueder
By his attorneys
Howson and Howson.

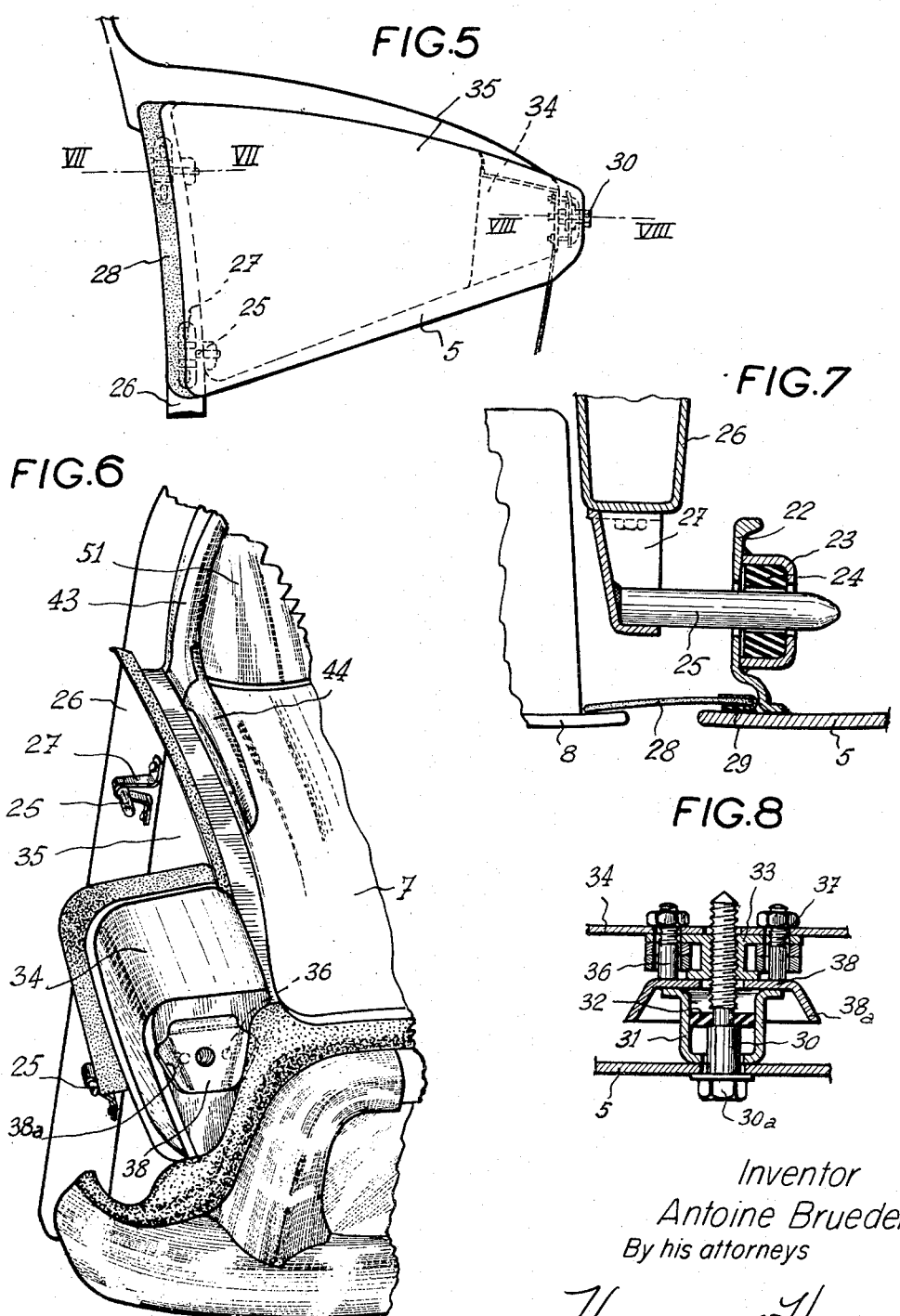

June 13, 1961 A. BRUEDER 2,988,397
MOTOR VEHICLE BODIES
Filed Sept. 19, 1956 4 Sheets-Sheet 4
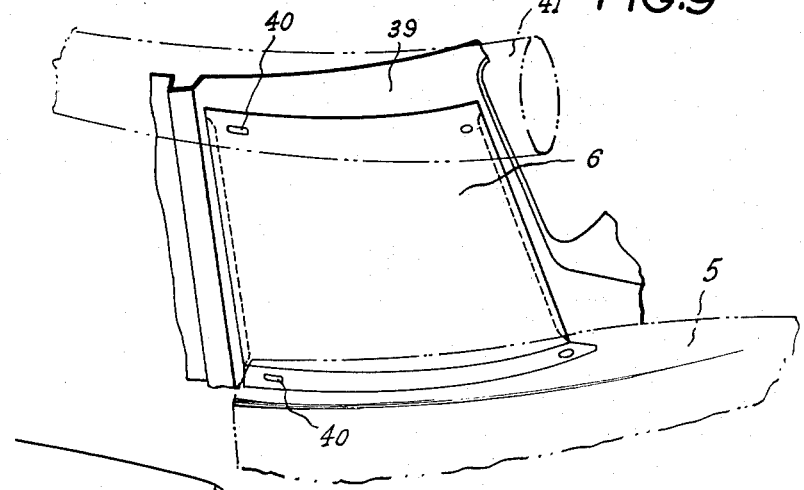
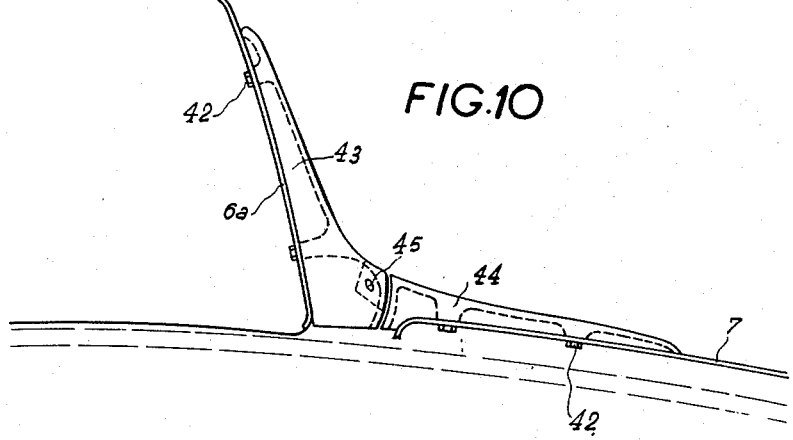
Inventor
Antoine Brueder
By his attorneys
Howson and Howson

United States Patent Office 2,988,397
Patented June 13, 1961

2,988,397
MOTOR VEHICLE BODIES
Antoine Brueder, Paris, France, assignor to Societe Anonyme Andre Citroen, Paris, France, a French company
Filed Sept. 19, 1956, Ser. No. 610,803
Claims priority, application France Sept. 24, 1955
5 Claims. (Cl. 296—28)

The motor vehicle bodies are at present generally constituted by a resistant framework or shell which supports the various mechanical members. A large part of this framework makes up external surface elements of the vehicle, so that this surface has to be highly finished.

With such a design even a small accident to a part of the body, for instance to a fender, involves relatively high repair costs.

The present invention has for its object an improved motor vehicle body which will in particular remedy this drawback.

According to the invention the body is constituted by a self-supporting skeleton or framework on which are mounted the various mechanical members and on which are fixed in a detachable manner elements which constitute the external surface of the vehicle and which are prefabricated with any desired finish, these elements being mounted in such a manner that no part of the skeleton or framework can normally be seen from the outside.

As a result of this disposition a repair which is necessary due to a slight accident and which concerns only a small surface of the body can be effected by removing the damaged element without interfering with other parts of the body. Moreover, if the user so wishes all the visible elements of the body can easily be replaced by other elements which have a different colour or a different shape or are made from a different material and the external appearance of the vehicle can thus be completely changed if desired.

Figure 1:
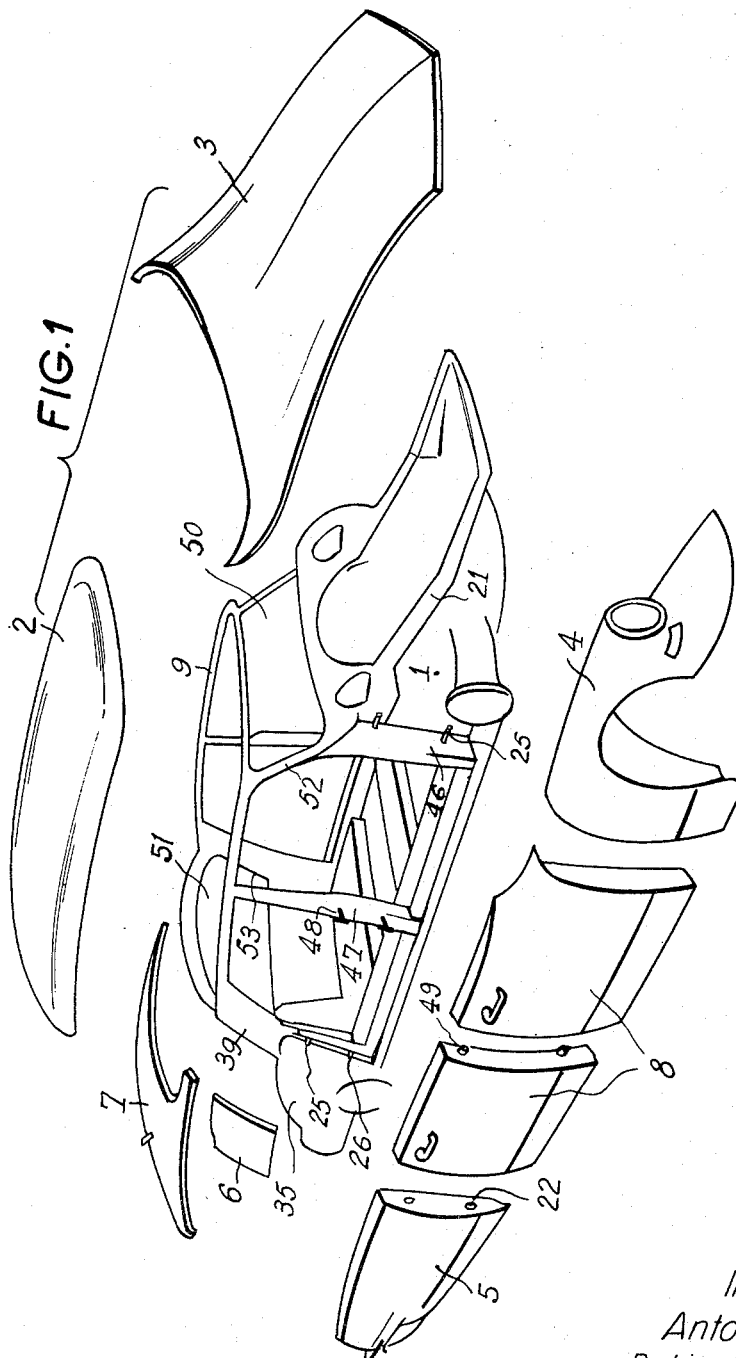
Figures 2, 3:
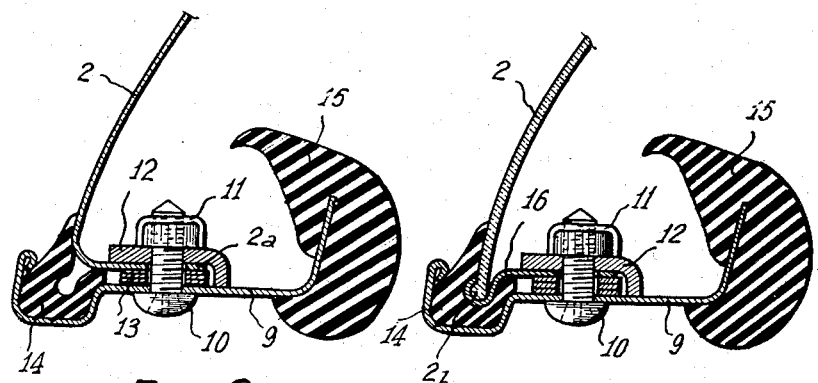
Figure 4:
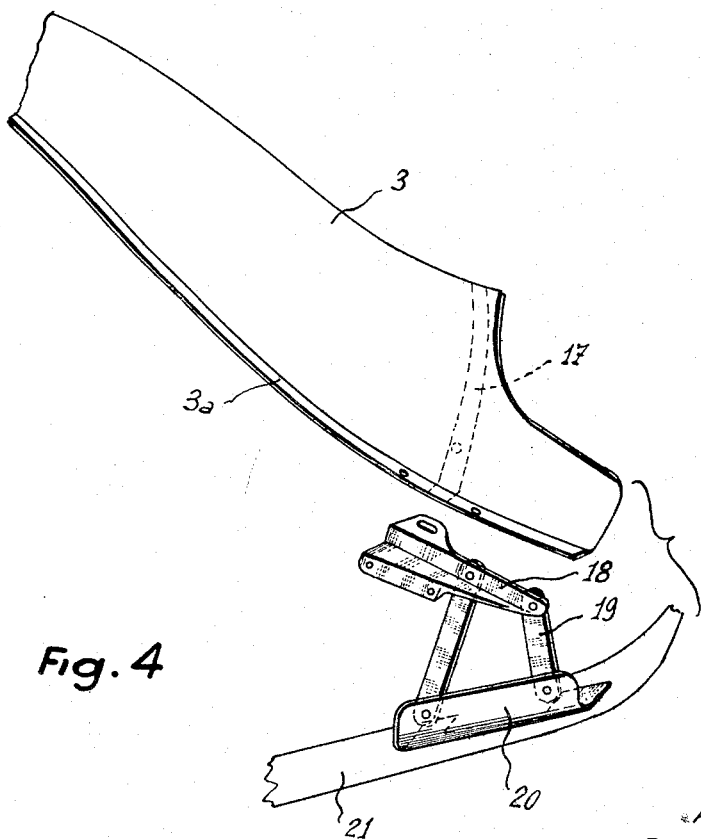

In order that the invention may be more clearly understood, reference will now be made to the accompanying drawings, which show one specific embodiment thereof by way of example, and in which:

FIG. 1 is an exploded perspective view of the body, the elements which constitute the outer surface of the vehicle being shown separately from the skeleton or framework, FIG. 2 is a transverse sectional view showing the manner in which the roof is secured to the skeleton, the roof being made from sheet metal, FIG. 3 is a similar view to that of FIG. 2, the roof being of a plastic material, FIGURE 4 is a fragmentary perspective view showing how the hood is secured, FIG. 5 is a side elevation view showing how one of the rear fenders is secured in the rear of the skeleton or framework, FIG. 6 is a perspective view of the rear of the skeleton before the fender has been mounted, FIG. 7 is a horizontal section along the line VII—VII of FIG. 5, FIG. 8 is a horizontal section along the line VIII—VIII of FIG. 5, FIG. 9 is a side elevation view showing how one of the quarter panels is secured, and FIG. 10 is a side elevation view showing how the lid of the boot is mounted on the skeleton or framework.

In the embodiment shown in the drawing the body comprises a self-supporting skeleton or framework which is generally designated by the reference numeral 1 and on which are mounted the various mechanical members in particular the engine, the axles and the transmission gear which may be referred to generally as the driving means. On this framework may be fixed in a manner described in further detail hereafter a roof 2, a hood 3, front fenders 4 and rear fenders 5, quarter panels 6, a boot lid 7 and doors 8.

When the roof 2 is made of sheet metal as shown in FIG. 2 it comprises a bent-over portion 2a secured to the edge of the top 9 of the skeleton by means of screws 10 and of capped nuts 11 with the insertion of a concave edge plate 12 and a distance-piece or washer 13. As shown in FIGS. 2 and 3, the plate is angular in cross section. Hence, when the bolt 10 is tightened, the longitudinal edges of the plate press on the frame 9 and the inturned edge of the roof. The concentration of the force along the longitudinal edges thus increases the pressure per square inch at the lines of contact and provides firmer securement. Tightness is ensured by a joint 14 tightened between the top of the skeleton and the roof. An antishock lining 15 is arranged on the inside edge of the top of the skeleton.

In the case of a roof which is made of a plastic material as shown in FIG. 3, the roof has a beaded edge 2b set in a bracket 16 which is fixed to the top 9 of the skeleton by means of the screw 10.

The hood 3, shown in FIG. 4, comprises at its lower part, side flanges 3a and on its inward face reinforcements 17. It is fixed by means of said side flanges and reinforcements on brackets 18 connected by means of articulated links 19 to brackets 20 which are themselves secured to the side of scuttle 21.

As can be seen in FIGS. 5 to 8 the rear fenders 5 carry on the inside face of their front edge a rib 22 on which are held, by means of welded caps 23, sockets or sleeves 24, the rib and caps being perforated at right angles to the bores of the sleeves 24. Studs 25 are fitted into the sleeves 24, said studs being secured to the pillar 26 of the skeleton by means of brackets 27. These, as well as the pillar 26 are hidden by a rubber strip 28, an edge of which is tightened by a shaped member 29 whilst its other edge is in contact with the door 8.

At its rear part the fender 5 carries a locking bolt 30 which goes through a socket 31 which is welded on the internal face of the fender and which cannot be taken out of the fender owing to the presence of a disc 32 whose hole has a diameter which is equal to the inner thread diameter of the bolt. The head 30a of this bolt is for instance plated with chromium in order to form an ornamental element.

The screw 30 is mounted in a support 33 which is adjustably fixed on a shoe 34 which is integral with the rear 35 of the skeleton by means of screws 36 going through holes 37 of the shoe. The screws 36 are riveted on a plate 38 whose lateral edges 38a are folded back toward the outside, the space comprised between these edges being wider at their upper part than at their lower part. These edges thus form a guide for the socket 31.

In order to mount the fender, the sleeves 24 are located over the studs 25 and the socket 31 is slipped between the edges 38a of the plate 38. It is then only necessary to screw the nut 30 in the support 33.

The front fenders are fixed in a similar manner but it is advantageous to provide two locking screws because the front fenders are in general more developed.

The quarter panels 6 shown in FIG. 9 are secured to the part 39 of the skeleton by screws passing through apertures or elongated button-holes or slots such as 40 provided on the upper edge and on the lower edge of the panel. The upper apertures are hidden for instance by blinkers 41 whilst the lower apertures are hidden by the corresponding rear fender 5.

The boot or luggage compartment lid 7 shown in FIG. 10 is fixed to flanges 6a of the quarter panels 6 by means of studs 42 and hinges comprising branches 43 and 44 connected together by pivots 45.

The doors 8 are secured to the front vertical pillars 46 and the center vertical pillars 47 as follows: opposite pivots 48 are adjustably fixed on these pillars, said opposite pivots fitting in recesses 49 provided in the door.

The upper part of the centre pillars 47 is hidden by detachable strips which are not shown in the drawings.

On the other hand the windshield 50 and the rear window 51 are secured as follows; their upper edge and their lateral edges are fitted into profiled members in which are partially set the pillars 52 of the windshield, the pillars 53 of the rear window and the edge of the top 9 of the skeleton. The pillars 52 are therefore hidden by the corresponding profiled members; similarly the pillars 53 are partly hidden by the profiled members and partly by the quarter panels; lastly the top 9 of the skeleton is partly hidden by the profiled members and partly by the roof 2.

It is thus seen that the whole surface of the skeleton or framework 1 is hidden and that the visible parts of the body are easily detachable.

It is obvious that the invention is not limited to the specific embodiment described and shown but that it covers on the contrary all modifications thereof.

What I claim is:

1. In an automobile body structure, the means for attaching body elements such as fenders to the frame of the automobile comprising stud members and sleeve members affixed on adjacent parts, the sleeve members being adapted to fit on the stud members to locate and hold the body element in proper position, and a bolt and nut assembly spaced from and independent of said studs comprising a first member secured on the body element, a guide member on the frame adapted to cooperate with and to guide said first member, and a bolt passing through both, to secure the body member to the frame after said stud and sleeve members have been fitted together.

2. An automobile body structure comprising, a combined skeleton frame and chassis structure comprising an integral unit on which are mounted the driving means for the automobile, said skeleton frame including a windshield and a rear window, body elements the exterior surfaces of which make up the body and provide the body contour, said body elements including a hood hinged to the frame and generally conforming when in closed position to the contour of the lower edge of the windshield, a cover for a rear luggage compartment hinged to the said skeleton frame and generally conforming when in closed position to the contour of the lower edge of the rear window, on each side of said skeleton frame there being a front part, a rear part and at least one door, means to support each element individually at spaced points on the skeleton frame, the means for attaching certain body elements to said skeleton frame comprising stud members and sleeve members affixed on adjacent parts, the sleeve members being adapted to fit on the stud members to locate and hold the body element in proper position, and a bolt and nut assembly spaced from and independent of said studs comprising a first member secured on the body element, a flared guide member on the frame adapted to cooperate with and to guide said first member, and a bolt passing through both, to secure the body member to the frame after said stud and sleeve members have been fitted together, said means-to-support-at-spaced-points being of minimum number and positioned to enable the form and dimensions of said body elements to be independent of said skeleton frame and capable of variation as to shape subject only to the number and location of such spaced suporting means, whereby to allow style changes without the need to change the form of the skeleton frame.

3. An automobile body structure comprising, a combined skeleton frame and chassis structure comprising an integral unit on which are mounted the driving means for the automobile, said skeleton frame including a windshield opening and a rear window opening, body elements the exterior surfaces of which make up the body and provide the body contour, said body elements including a hood hinged to the frame and generally conforming when in closed position to the contour of the lower edge of the windshield opening, a cover for a rear luggage compartment hinged to the said skeleton frame and generally conforming when in closed position to the contour of the lower edge of the rear window opening, a roof panel, on each side of said skeleton frame there being a front part, a rear part and at least one door, means to support each element individually at spaced points on the skeleton frame, the means to secure the roof panel along its edges to said frame at spaced points comprising edge plate means, and securing means inserted through said frame and edge plate means, the means for attaching certain body elements to said skeleton frame comprising stud members and sleeve members affixed on adjacent parts, the sleeve members being adapted to fit on the stud members to locate and hold the body element in proper position, and a bolt and nut assembly spaced from and independent of said studs comprising a first member secured on the body element, a guide member on the frame adapted to cooperate with and to guide said first member, and a bolt passing through both, to secure the body member to the frame after said stud and sleeve members have been fitted together, said means-to-support-at-spaced-points being of minimum number and positioned to enable the form and dimensions of said body elements to be independent of said skeleton frame and capable of variation as to shape subject only to the number and location of such spaced supporting means, whereby to allow style changes without the need to change the form of the skeleton frame.

4. An automobile body structure comprising a combined skeleton frame and chassis structure comprising an integral unit on which are mounted the driving means for the automobile, said skeleton frame including a windshield opening and a rear window opening and a roof panel opening, body elements the exterior surfaces of which make up the body and provide the body contour, said body elements including a hood hinged to the frame and generally conforming when in closed position to the lower edge of the contour of the windshield opening, a cover for a rear luggage compartment hinged to the said skeleton frame, and generally conforming when in closed position to the lower edge of the contour of the rear window opening, a roof panel independent of said window and rear window openings, on each side of said skeleton frame there being a front part, a rear part and at least one door, means to support each element individually at spaced points on the skeleton frame, the means to secure the roof panel over said roof panel opening being along its edges, said means-to-support-at-spaced-points being of minimum number and positioned to enable the form and dimensions of said body elements to be independent of said skeleton frame and capable of variation as to shape subject only to the number and location of such spaced supporting means, whereby to allow style changes without the need to change the form of the skeleton frame.

5. An automobile body structure as claimed in claim 4 wherein the means to secure the roof panel along its edges comprises screw means inserted through said frame and said roof panel.

References Cited in the file of this patent

UNITED STATES PATENTS

| | | |
|---|---|---|
| 1,982,105 | Hughes | Nov. 27, 1934 |
| 1,990,757 | Stiles | Feb. 12, 1935 |
| 2,028,184 | Bergholt | Jan. 21, 1936 |
| 2,269,451 | Ford | Jan. 13, 1942 |
| 2,365,792 | Wohlfield | Dec. 26, 1944 |
| 2,606,625 | Paton | Aug. 12, 1952 |
| 2,612,233 | Newell | Sept. 30, 1952 |
| 2,691,545 | Lyon | Oct. 12, 1954 |
| 2,778,673 | Barenyi et al. | Jan. 22, 1957 |

FOREIGN PATENTS

| | | |
|---|---|---|
| 54,422 | France | Oct. 24, 1949 |
| | (1st Add. to No. 913,631) | |
| 526,159 | Great Britain | Sept. 11, 1940 |
| 614,004 | Great Britain | Dec. 8, 1948 |